(12) United States Patent
Inoue et al.

(10) Patent No.: US 6,867,529 B2
(45) Date of Patent: Mar. 15, 2005

(54) AC GENERATOR FOR VEHICLE

(75) Inventors: Hirokazu Inoue, Tokyo (JP); Tomoki Takahashi, Tokyo (JP); Hideyuki Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/475,017

(22) PCT Filed: Apr. 12, 2002

(86) PCT No.: PCT/JP02/03692

§ 371 (c)(1),
(2), (4) Date: Oct. 16, 2003

(87) PCT Pub. No.: WO03/088452

PCT Pub. Date: Oct. 23, 2003

(65) Prior Publication Data
US 2004/0130233 A1 Jul. 8, 2004

(51) Int. Cl.⁷ .................................................. H02K 5/14
(52) U.S. Cl. ....................................................... 310/239
(58) Field of Search .......................... 310/89, 233, 238, 310/239, 245, 263

(56) References Cited

U.S. PATENT DOCUMENTS 3,673,447 A * 6/1972 Zumbach et al. ........... 310/227
5,227,688 A * 7/1993 Gotoh ......................... 310/239
5,245,241 A * 9/1993 Gotoh ......................... 310/242

FOREIGN PATENT DOCUMENTS

JP 51-66409 6/1976
JP 51-87205 7/1976

* cited by examiner

Primary Examiner—Burton Mullins
(74) Attorney, Agent, or Firm—Sughrue Mion, PLLC

(57) ABSTRACT

The present invention provides an automotive alternator enabling a brush replacement operation to be improved by making a cap covering an opening portion for brush replacement formed in a case insertable to simplify removal and replacement of the cap.

A brush holder through which a brush insertion aperture is disposed and into a head portion of which a cover is fitted is disposed inside a case such that an aperture direction of the brush insertion aperture is perpendicular to an axial direction of a shaft, and a brush is disposed so as to be held inside the brush insertion aperture and slide in contact with a slip ring fixed to the shaft. An opening portion for brush replacement is formed in a portion of the case facing the cover, and a cap is insertably mounted to this opening portion.

8 Claims, 14 Drawing Sheets

AC GENERATOR FOR VEHICLE

TECHNICAL FIELD

The present invention relates to an automotive alternator driven by an internal combustion engine, for example, and particularly relates to a case construction for improving brush replacement in a brush holding apparatus.

BACKGROUND ART

Generally, a brush holding apparatus in an automotive alternator is mounted internally in a tightly-closed case, making it necessary to dismantle the case during brush replacement, thereby making workability extremely poor.

Thus, automotive alternators in which an opening is disposed in a portion of the case facing the brush holding apparatus, enabling the brushes to be changed through the opening, have been proposed in Japanese Utility Model Laid-Open No. SHO 51-87205, Japanese Patent Laid-Open No. SHO 51-66409, etc., for example.

FIGS. 29 and 30 are a longitudinal section and a plan, respectively, showing a vicinity of the brush holding apparatus of the conventional automotive alternator described in Japanese Patent Laid-Open No. SHO 51-66409, for example, and FIG. 31 is a perspective showing a brush assembly used in the brush holding apparatus shown in FIGS. 29 and 30.

In FIGS. 29 to 31, a rotor 81 is fixed to a shaft 82 rotatably supported in a front bracket (not shown) and a rear bracket 84a by means of bearings 83, being disposed inside a case 84 composed of the front bracket and the rear bracket 84a. Slip rings 85 are mounted to a rear-end end portion of the shaft 82.

A stator 86 is constituted by: a cylindrical stator core 87; and a stator winding 88 installed in the stator core 87, first and second end portions of the stator core 87 being held between the front bracket and the rear bracket 84a, the stator 86 being disposed so as to surround the rotor 81.

A brush holding apparatus 89 is constituted by: a brush body portion 90 through which a pair of brush-housing angular apertures 90a are disposed; and a pair of brush assemblies 95 in each of which a brush 91, a pigtail 92, a brush spring 93, and a brush terminal 94 are assembled integrally. This brush holding apparatus 89 is mounted to the rear bracket 84a by securely fastening the brush body portion 90 to an inner wall surface of an end wall of the rear bracket 84a by means of a screw 96, inserting the brushes 91 of each of the brush assemblies 95 into the brush-housing angular apertures 90a, and securely fastening the brush terminals 94 to the brush body portion 90 by means of screws 97. Thus, the brushes 91 are forced into contact with the slip rings 85 by the brush springs 93.

In addition, an opening 98 for brush replacement is disposed through a portion of a side wall of the rear bracket 84a facing the brush body portion 90. A cover 99 is securely fastened to an outer circumferential surface of the side wall of the rear bracket 84a by means of screws 100 so as to cover the opening 98.

A brush replacement operation of the conventional automotive alternator constructed in this manner will now be explained.

First, the cover 99 is removed by removing the screws 100. Then, the screws 97 are removed and the brush assemblies 95 are pulled out through the opening 98. Next, the brushes 91 of new brush assemblies 95 are inserted into the brush-housing angular apertures 90a, and the brush terminals 94 are securely fastened to the brush body portion 90 by means of the screws 97 while pressing the brush springs 93. In addition, the cover 99 is placed over the opening 98 and securely fastened to the rear bracket 84a by means of the screws 100, completing replacement of the brushes 91.

However, in this conventional automotive alternator, because the cover 99 is mounted to the rear bracket 84a by means of fastening by the screws 100, one problem has been that removal and replacement of the screws 100 is required in a narrow engine compartment, lowering brush replacement work efficiency.

SUMMARY OF THE INVENTION

The present invention aims to solve the above problem and an object of the present invention is to provide an automotive alternator enabling a brush replacement operation to be improved by making a cap covering an opening portion for brush replacement formed in a case insertable to simplify removal and replacement of the cap.

In an automotive alternator according to the present invention, first and second ends of a shaft are rotatably supported in a case, and a rotor is fixed to the shaft and is rotatably disposed inside the case. A slip ring is fixed to the shaft, and a stator is fixed to the case so as to surround the rotor. A brush holder through which a brush insertion aperture is disposed and into a head portion of which a cover is fitted is disposed inside the case such that an aperture direction of the brush insertion aperture is perpendicular to an axial direction of the shaft, and a brush is disposed so as to be held inside the brush insertion aperture and slide in contact with the slip ring. An opening portion is formed in a portion of the case facing the cover, and a cap is insertably mounted to this opening portion. Thus, an automotive alternator is provided in which removal and replacement of the cap is simplified, enabling the brush to be changed without dismantling the case.

BEST MODE FOR CARRYING OUT THE INVENTION

Preferred embodiments of the present invention will now be explained with reference to the drawings.

Embodiment 1

Figure 1:
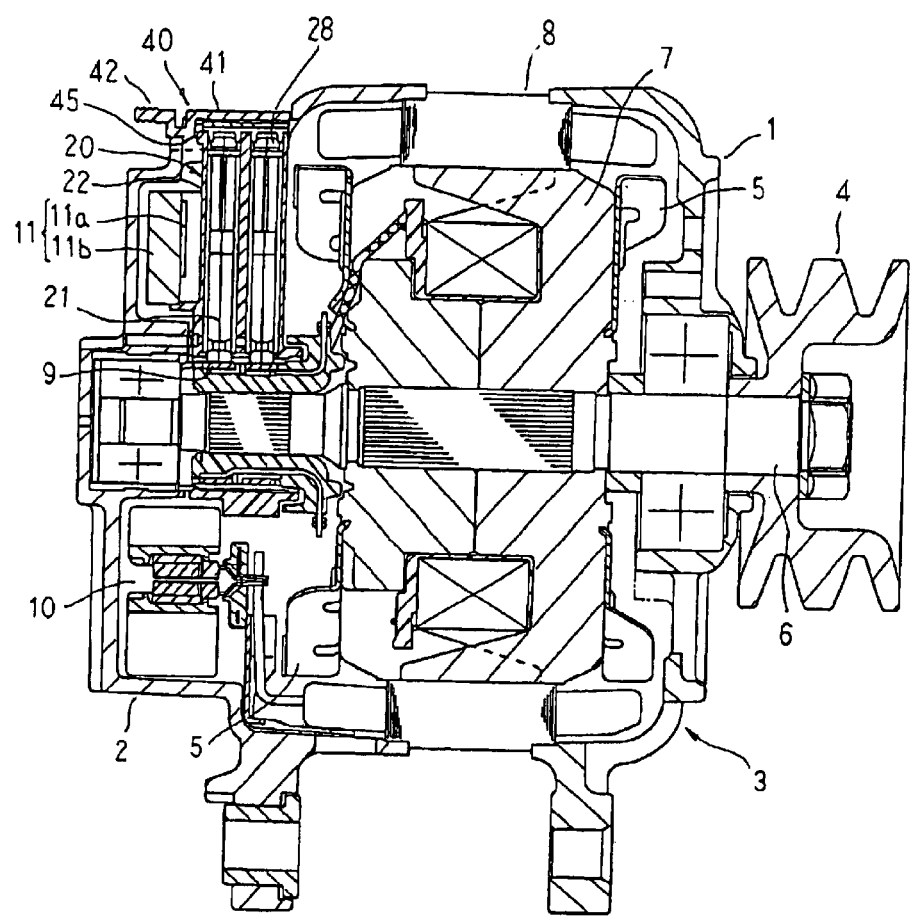
FIG. 1 is a longitudinal section showing an automotive alternator according to Embodiment 1 of the present invention.
Figure 2:
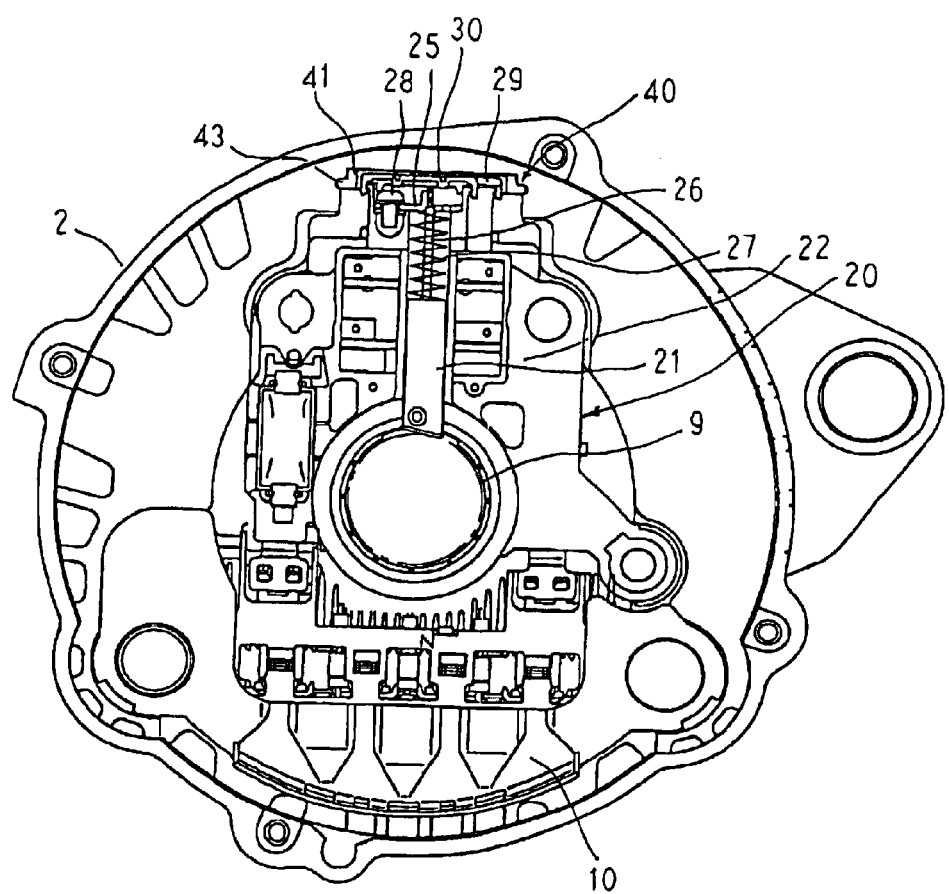
FIG. 2 is a plan partly in section showing a rear bracket end of an interior portion of the automotive alternator according to Embodiment 1 of the present invention.
Figure 3:
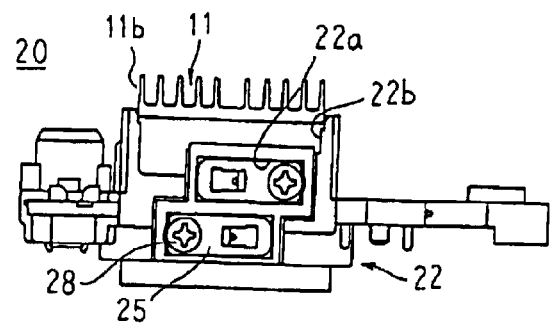
FIG. 3 is a plan showing a brush holding apparatus used in the automotive alternator according to Embodiment 1 of the present invention with a cover removed.
Figure 4:
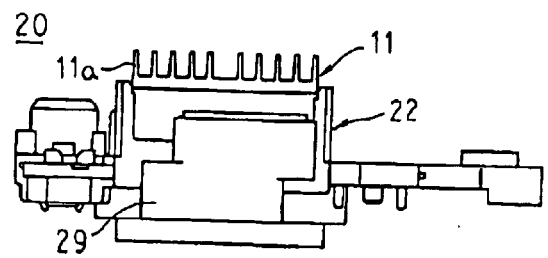
FIG. 4 is a plan showing the brush holding apparatus used in the automotive alternator according to Embodiment 1 of the present invention.
Figure 5:
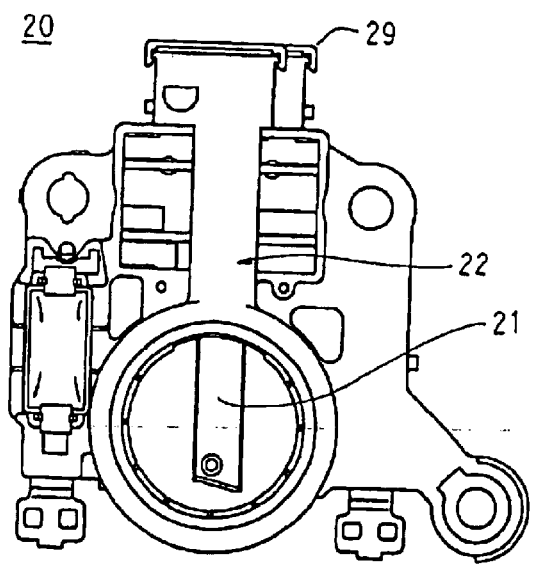
FIG. 5 is a front elevation showing the brush holding apparatus used in the automotive alternator according to Embodiment 1 of the present invention.
Figure 6:
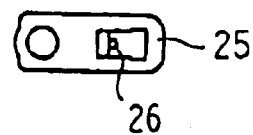
FIG. 6 is a front elevation showing a brush assembly of the brush holding apparatus used in the automotive alternator according to Embodiment 1 of the present invention.
Figure 7:
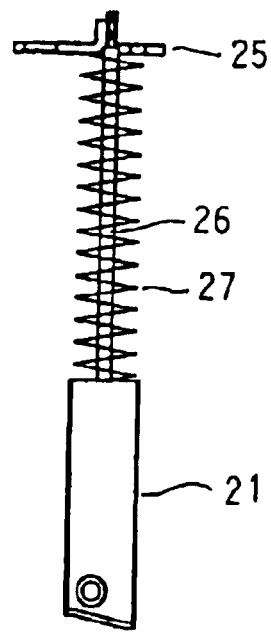
FIG. 7 is a side elevation showing the brush assembly of the brush holding apparatus used in the automotive alternator according to Embodiment 1 of the present invention.
Figure 8:
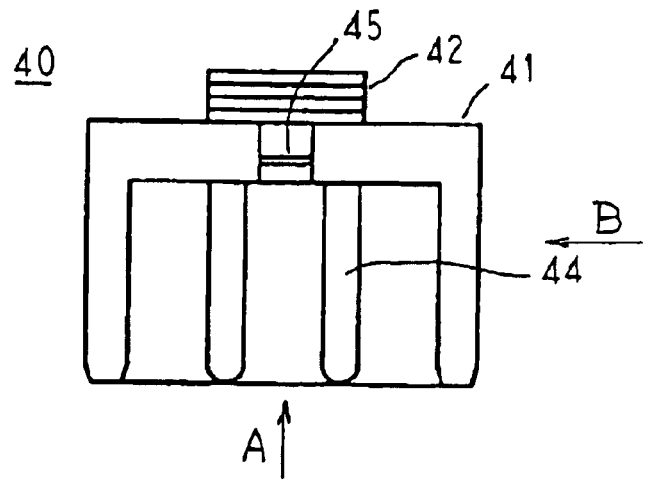
FIG. 8 is a plan showing a cap used in the automotive alternator according to Embodiment 1 of the present invention.
Figure 9:
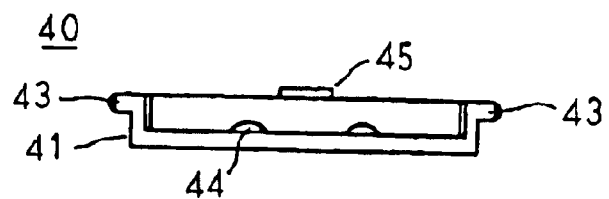
FIG. 9 is a side elevation of the cap shown in FIG. 8 viewed from direction A.
Figure 10:
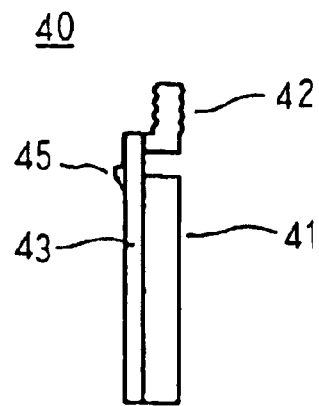
FIG. 10 is a side elevation of the cap shown in FIG. 8 viewed from direction B.
Figure 11:
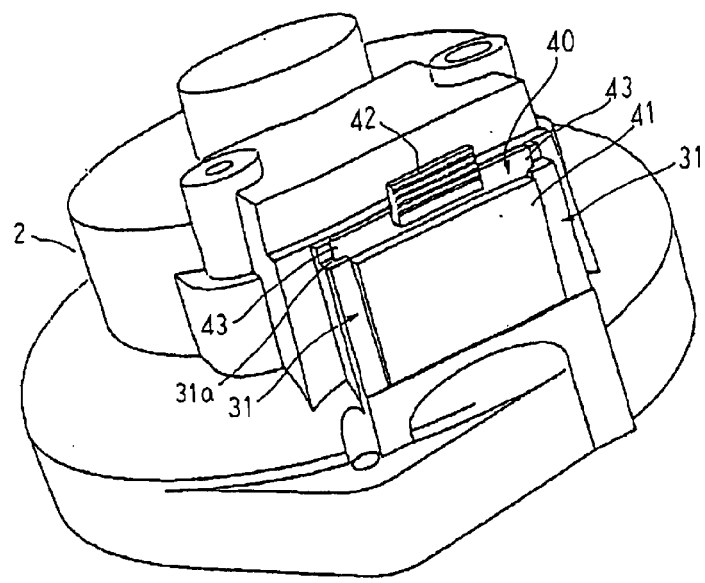
FIG. 11 is a perspective showing the rear bracket of the automotive alternator according to Embodiment 1 of the present invention with the cap mounted.
Figure 12:
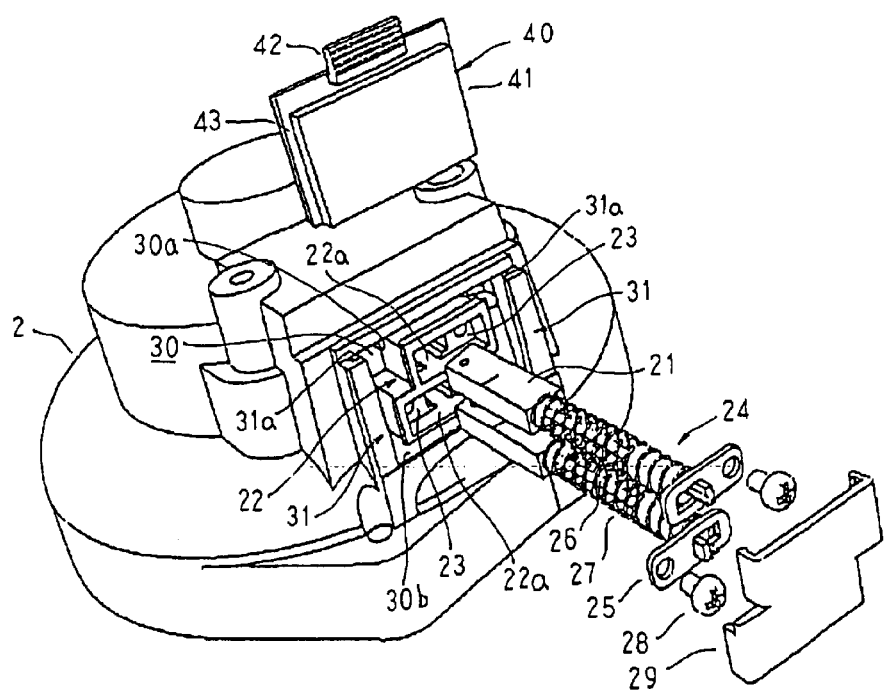
FIG. 12 is a perspective showing the rear bracket of the automotive alternator according to Embodiment 1 of the present invention with the cap removed.

FIG. 1 is a longitudinal section showing an automotive alternator according to Embodiment 1 of the present invention, FIG. 2 is a plan partly in section showing a rear bracket end of an interior portion of the automotive alternator according to Embodiment 1 of the present invention, FIG. 3 is a plan showing a brush holding apparatus used in the automotive alternator according to Embodiment 1 of the present invention with a cover removed, FIG. 4 is a plan showing the brush holding apparatus used in the automotive alternator according to Embodiment 1 of the present invention, FIG. 5 is a front elevation showing the brush holding apparatus used in the automotive alternator according to Embodiment 1 of the present invention, FIG. 6 is a front elevation showing a brush assembly of the brush holding apparatus used in the automotive alternator according to Embodiment 1 of the present invention, FIG. 7 is a side elevation showing the brush assembly of the brush holding apparatus used in the automotive alternator according to Embodiment 1 of the present invention, FIG. 8 is a plan showing a cap used in the automotive alternator according to Embodiment 1 of the present invention, FIG. 9 is a side elevation of the cap shown in FIG. 8 viewed from direction A, FIG. 10 is a side elevation of the cap shown in FIG. 8 viewed from direction B, FIG. 11 is a perspective showing the rear bracket of the automotive alternator according to Embodiment 1 of the present invention with the cap mounted, and FIG. 12 is a perspective showing the rear bracket of the automotive alternator according to Embodiment 1 of the present invention with the cap removed.

This automotive alternator includes: a case 3 constituted by a front bracket 1 and a rear bracket 2 made of aluminum, each being prepared into a general cup shape; a shaft 6 rotatably disposed inside the case 3, a pulley 4 being fixed to a first end portion of the shaft 6; a Lundell-type rotor 7 fixed to the shaft 6; a stator 8 mounted to the case 3, the stator 8 being held between the front and rear brackets 1 and 2 so as to surround the rotor 7; fans 5 respectively fixed to first and second end portions of the rotor 7; a pair of slip rings 9 fixed to a second end portion of the shaft 6 for supplying electric current to the rotor 7; a brush holding apparatus 20 in which a pair of brushes 21 sliding on a surface of each of the slip rings 9 are housed inside a brush holder 22; a rectifier 10 electrically connected to the stator 8 for converting alternating current generated in the stator 8 into direct current; and a regulator 11 fitted onto the brush holder 22, the regulator 11 adjusting the magnitude of the alternating voltage generated in the stator 8.

The brush holder 22 is made of a resin such as a polyphenylene sulfide (PPS), etc. A pair of angular brush insertion apertures 22a are formed so as to pass through the brush holder 22, and terminals 23 electrically connected to a battery (not shown) constituting an electric power supply are formed integrally on the brush holder 22. Brush assemblies 24 are each constructed such that a brush 21 and a brush terminals 25 are connected by a wire 26, a spring 27 being disposed in a compressed state between the brush 21 and the brush terminal 25. The brush holding apparatus 20 is constructed by mounting these brush assemblies 24 to the brush holder 22 by inserting the brushes 21 inside the brush insertion apertures 22a and securely fastening the brush terminals 25 to the terminals 23 by means of screws 28 from longitudinally outside the brushes 21. Then, a cover 29 provided with a packing (not shown) on an inner wall surface is fitted into a head portion of the brush holder 22 from longitudinally outside the brushes 21, shielding the fastening portion between the terminals 23 and the brush terminals 25 and the brush insertion apertures 22a from the outside, thereby ensuring that the brush holding apparatus 20 is waterproof The brush holding apparatus 20 constructed in this manner is mounted to the rear bracket 2 such that the longitudinal direction of the brushes 21 is perpendicular to an axial direction of the shaft 6. Thus, the brushes 21 are pushed against the slip rings 9 by the force of the springs 27 and slide on the slip rings 9 due to the rotation of the shaft 6. Furthermore, the brush holder 22 extends in a radial direction to a vicinity of an inner wall surface of a side portion of the rear bracket 2. An opening portion 30 for brush replacement is formed in a rectangular shape in a portion of the side portion of the rear bracket 2 facing the cover 29 of the brush holding apparatus 20 longitudinally (radially) outside the brushes 21.

The rectifier 10 is mounted to the rear bracket 2 in a plane perpendicular to the axial direction of the shaft 6 so as to overlap the brush holding apparatus 20 in a circumferential direction. The regulator 11 is constructed by fixing a circuit board 11a mounted with electronic components to a heat sink 11b. The regulator 11 is mounted by fitting the heat sink 11b onto the brush holder 22 such that the circuit board 11a is housed inside a circuit housing portion 22b of the brush holder 22. Thus, the heat sink 11b of the regulator 11 faces an inner wall surface of an end portion of the rear bracket 2.

In the opening portion 30 of the rear bracket 2, a pair of side walls 31 are formed facing each other parallel to the axial direction of the shaft 6. Grooves 31a parallel to the axial direction are formed in the facing inner wall surfaces of the pair of side walls 31. Moreover, an upper surface of a front-end wall of the opening portion 30 is positioned in a common plane with lower surfaces of the grooves 31a of the side walls 31, and an upper surface of a rear-end wall is positioned in a substantially common plane with upper surfaces of the side walls 31.

The cap 40 is made of a polybutylene terephthalate (PBT) resin, and is constituted by: a main body portion 41 formed into a general box shape; a handle 42 disposed so as to extend from a first end of the main body portion 41; flange portions 43 disposed so as to extend from first and second side portions, respectively, of the main body portion 41; protruding portions 44 disposed so as to protrude from an inner wall surface of the main body portion 41; and an engaging portion 45 for preventing dislodgment disposed so as to protrude from a first end of the inner wall surface of the main body portion 41. This cap 40 is mounted to the opening portion 30 by holding the handle 42, inserting the flange portions 43 into the grooves 31a, sliding the cap 40 until a second end portion of the main body portion 41 comes into contact with a rear-end surface 30b of the opening portion 30, and then elastically engaging the engaging portion 45 in the front-end surface 30a of the opening portion 30. Thus, the opening portion 30 is covered by the cap 40. The protruding portions 44 press an upper surface of the cover 29 radially inward, compressing the packing on the cover 29.

During replacement of the brushes 21, the elastic engagement between the engaging portion 45 and the front-end surface 30a of the opening portion 30 is released by holding the handle 42 and pulling upward in a radial direction (upward in FIG. 1), then the cap 40 is pulled out by sliding it toward a front end of the opening portion 30. Next, after removing the cover 29, the screws 28 are removed, and the brush assemblies 24 are pulled out of the brush insertion apertures 22a. Then, the brushes 21 of new brush assemblies 24 are inserted into the brush insertion apertures 22a, the brush terminals 25 are securely fastened to the terminals 23 by means of the screws 28 from longitudinally (radially) outside the brushes 21, and the cover 29 is fitted into the head portion of the brush holder 22. Next, the replacement of the brushes 21 is completed by inserting the cap 40 into the opening portion 30 in a similar manner.

In the automotive alternator according to Embodiment 1, because the opening portion 30 is formed in the portion of the case 3 (the rear bracket 2) facing the cover 29 of the brush holding apparatus 20 and the cap 40 is mounted so as to cover the opening portion 30, the brushes 21 can be replaced by removing the cap 40, removing the cover 29, then removing the screws 28 and replacing each of the brush assemblies 24, making it unnecessary to dismantle the case 3.

Because the cap 40 is mounted by insertion into the opening portion 30, tools such as screw drivers, etc., are not required for removing and replacing the cap 40, improving the brush replacement operation.

Because the cap 40 is mounted by inserting the flange portions 43 while sliding in the grooves 31a of the side walls 31, removal and replacement of the cap 40 can be performed simply by pushing or pulling the cap 40 in one direction, improving the brush replacement operation.

When an automotive alternator is mounted to an automotive vehicle, there is clear space in the axial direction of the automotive alternator. Because the sliding direction of this cap 40 is aligned with the axial direction of the shaft 6, space for removal of the cap 40 is ensured, further improving the brush replacement operation.

Because the cap 40 is made of the PBT resin and has elasticity, the engaging portion 45 of the cap 40 engages the front-end surface 30a of the opening portion 30 elastically, preventing the cap 40 from dislodging due to vibration, etc. Because the handle 42 is formed integrally on the cap 40, handling of the cap 40 is facilitated. Furthermore, because the protruding portions 44 are formed on the cap 40 and the protruding portions 44 press on the cover 29 when the cap 40 is mounted to the opening portion 30, the packing on the cover 29 is in a compressed state, improving the waterproofing of the brush holding apparatus 20.

Moreover, Embodiment 1 above has been explained for a case in which the flange portions 43 are slidably inserted into the grooves 31a and the cap 40 is secured to the opening portion 30 by elastically engaging the engaging portion 45 in the front-end surface 30a of the opening portion 30, but the method for inserting the cap 40 into the opening portion 30 is not limited to this.

For example, the cap 40 may also be secured to the opening portion 30 by disposing protrusions on the flange portions 43, disposing recess portions in inner wall surfaces of the grooves 31a, and inserting the protrusions into the recess portions when mounting the cap 40 to the opening portion 30.

The width of the grooves 31a may also be made narrow in such a way that the cap 40 is secured to the opening portion 30 by press-fitting the flange portions 43. Leaf springs may also be mounted to the grooves 31a in such a way that when the cap 40 is mounted to the opening portion 30, the flange portions 43 is secured by the force of the leaf springs. In those cases, it is not necessary to prepare the cap 40 using the PBT resin; a metal material can be used.

Furthermore, in Embodiment 1 above, the protruding portions 44 are molded integrally when the cap 40 is molded using the PBT resin, but an elastic material such as a leaf spring or a silicone resin, for example, may also be fixed to the inner wall surface of the cap as a protruding portion after molding the cap.

Embodiment 2

Figure 13:
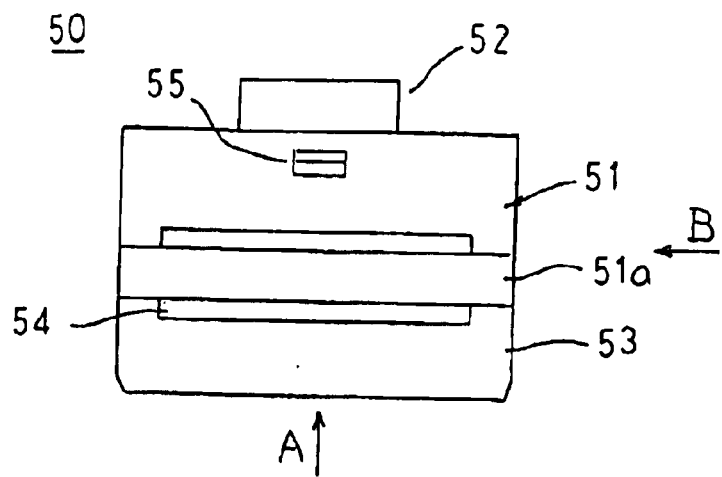
FIG. 13 is a plan showing a cap used in an automotive alternator according to Embodiment 2 of the present invention.
Figure 14:
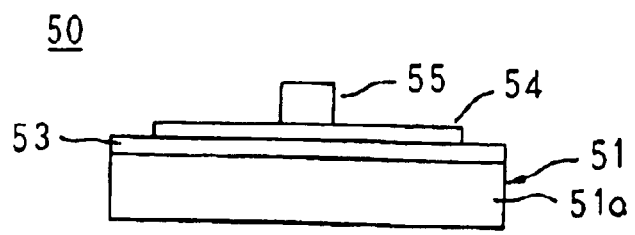
FIG. 14 is a side elevation of the cap shown in FIG. 13 viewed from direction A.
Figure 15:
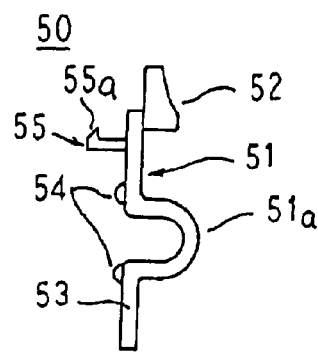
FIG. 15 is a side elevation of the cap shown in FIG. 13 viewed from direction B.
Figure 16:
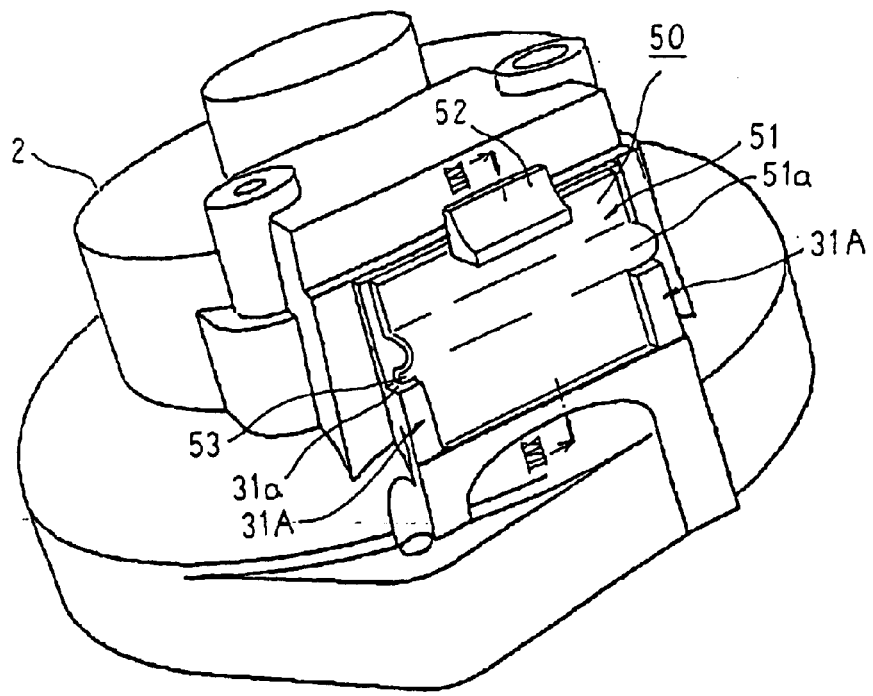
FIG. 16 is a perspective showing a rear bracket of the automotive alternator according to Embodiment 2 of the present invention with the cap mounted.
Figure 17:
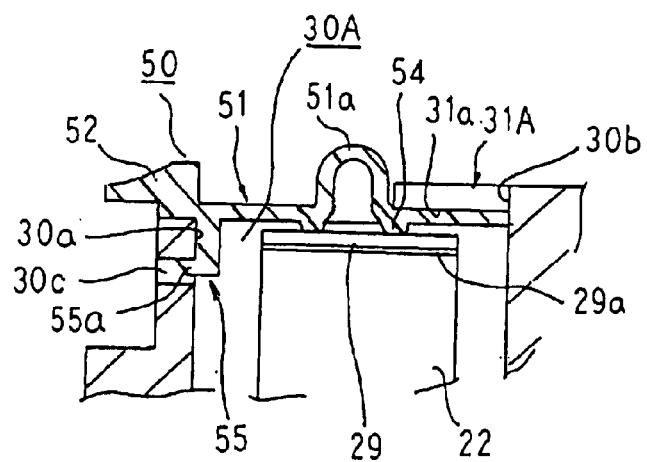
FIG. 17 is a cross section taken along line XVII—XVII in FIG. 16 viewed from the direction of the arrows.
Figure 18:
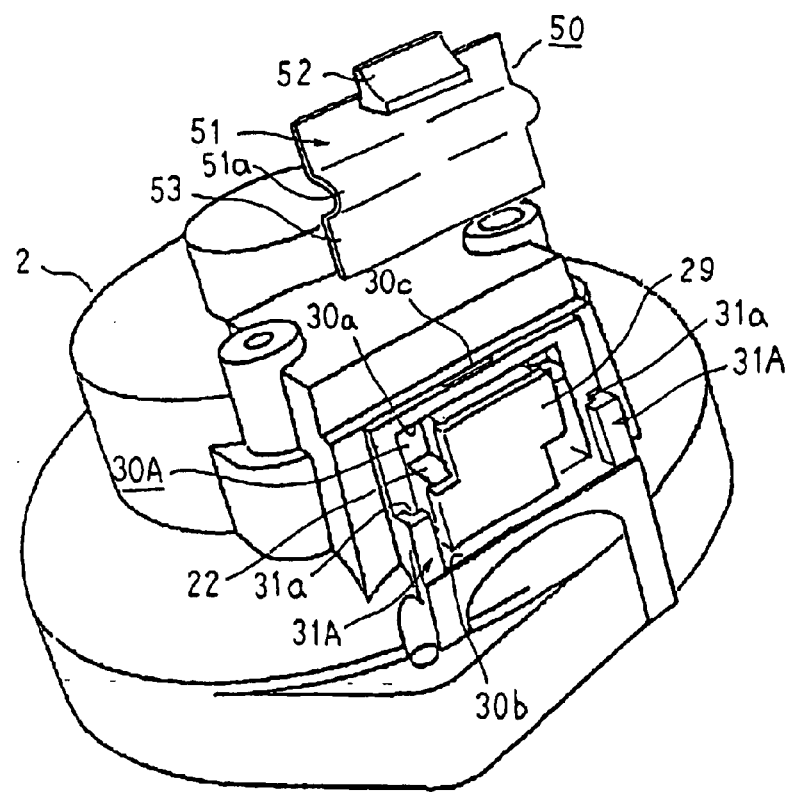
FIG. 18 is a perspective showing the rear bracket of the automotive alternator according to Embodiment 2 of the present invention with the cap removed.

FIG. 13 is a plan showing a cap used in an automotive alternator according to Embodiment 2 of the present invention, FIG. 14 is a side elevation of the cap shown in FIG. 13 viewed from direction A, FIG. 15 is a side elevation of the cap shown in FIG. 13 viewed from direction B, FIG. 16 is a perspective showing a rear bracket of the automotive alternator according to Embodiment 2 of the present invention with the cap mounted, FIG. 17 is a cross section taken along line XVII—XVII in FIG. 16 viewed from the direction of the arrows, and FIG. 18 is a perspective showing the rear bracket of the automotive alternator according to Embodiment 2 of the present invention with the cap removed.

In Embodiment 2, at rear-end ends of side portions of a rectangular opening portion 30A in the rear bracket 2, a pair of side walls 31A are formed facing each other parallel to the axial direction of the shaft 6. Grooves 31a parallel to the axial direction are formed in the facing inner wall surfaces of the pair of side walls 31A. An engaging aperture 30c is disposed through a front-end wall of the opening portion 30A. Moreover, an upper surface of a bracket-shaped wall constituted by the front-end wall and the front-end ends of the side walls of the opening portion 30A is positioned in a common plane with lower surfaces of the grooves 31a of the side walls 31A, and an upper surface of a rear-end wall is positioned in a substantially common plane with upper surfaces of the side walls 31A.

The cap 50 is made of a PBT resin, and is constituted by: a flat, rectangular main body portion 51 having a generally U-shaped curved portion 51a formed into a central portion; a handle 52 disposed so as to extend from a first end of the main body portion 51; flange portions 53 formed by first and second side portions of the main body portion 51; protruding portions 54 disposed so as to protrude from first and second end positions of the curved portion 51a on an inner wall surface of the main body portion 51; and an engaging portion 55 for preventing dislodgment disposed so as to protrude from a first end of the inner wall surface of the main body portion 51.

This cap 50 is held by the handle 52, the flange portions 53 are inserted into the grooves 31a, and the cap 50 is slid until a second end portion of the main body portion 51 comes into contact with a rear-end surface 30b of the opening portion 30A. Then, the curved portion 51a is deformed elastically by pressing the handle 52 toward the rear-end surface 30b of the opening portion 30A. The engaging portion 55 is inserted inside the opening portion 30A by lowering the handle 52 radially downward (toward the shaft 6) with the curved portion 51a deformed elastically, and then pressure on the handle 52 is released. Thus, the curved portion 51a returns to its original state, a hook 55a on the engaging portion 55 is inserted into the engaging aperture 30c in the front-end wall of the opening portion 30A, and the cap 50 is mounted to the opening portion 30A with the engaging portion 55 engaged elastically in the front-end wall of the opening portion 30A. Thus, the opening portion 30A is covered by the cap 50. The protruding portions 54 press an upper surface of the cover 29 radially inward, compressing the packing 29a on the cover 29.

During replacement of the brushes 21, the hook 55a of the engaging portion 55 is pulled out of the engaging aperture 30c by holding the handle 52 and pressing it toward the rear-end surface 30b of the opening portion 30A to deform the curved portion 5a elastically. The engaging portion 55 is pulled out of the opening portion 30A by raising the handle 52 radially upward (away from the shaft 6) with the curved portion 51a deformed elastically, and then pressure on the handle 52 is released. Thus, the curved portion 51a returns to its original state. Then, the handle 52 is held and the cap 50 is pulled out by sliding it toward a front end of the opening portion 30A. Next, after removing the cover 29, the screws 28 are removed, and the brush assemblies 24 are pulled out of the brush insertion apertures 22a. Then, the brushes 21 of new brush assemblies 24 are inserted into the brush insertion apertures 22a, the brush terminals 25 are securely fastened to the terminals 23 by means of the screws 28 from longitudinally (radially) outside the brushes 21, and the cover 29 is fitted into the head portion of the brush holder 22. Next, the replacement of the brushes 21 is completed by inserting the cap 50 into the opening portion 30A in a similar manner.

Consequently, similar effects to those in Embodiment 1 above can also be achieved in Embodiment 2.

Furthermore, in Embodiment 2, because the hook 55a of the engaging portion 55 is inserted into the engaging aperture 30c in the front-end wall of the opening portion 30A, the cap 50 is reliably prevented from dislodging due to vibration, etc.

Embodiment 3

Figure 19:
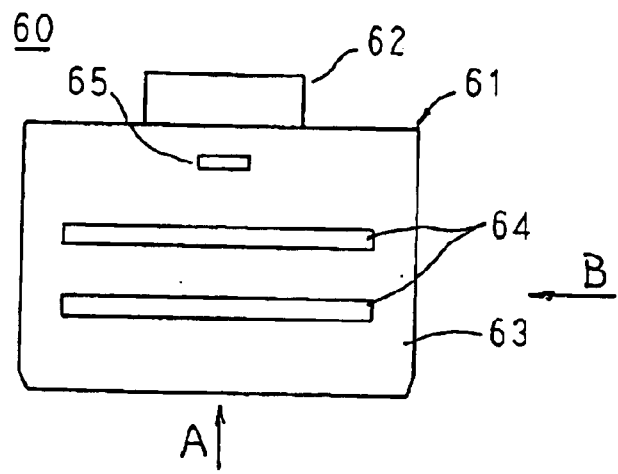
FIG. 19 is a plan showing a cap used in an automotive alternator according to Embodiment 3 of the present invention.
Figure 20:
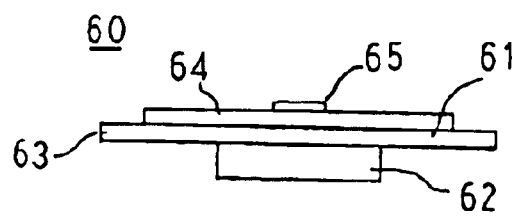
FIG. 20 is a side elevation of the cap shown in FIG. 19 viewed from direction A.
Figure 21:
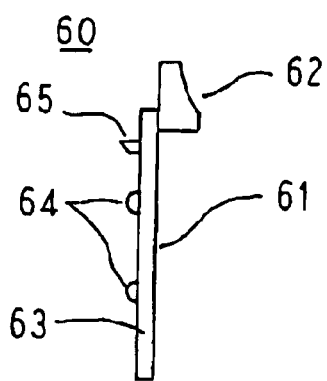
FIG. 21 is a side elevation of the cap shown in FIG. 19 viewed from direction B.
Figure 22:
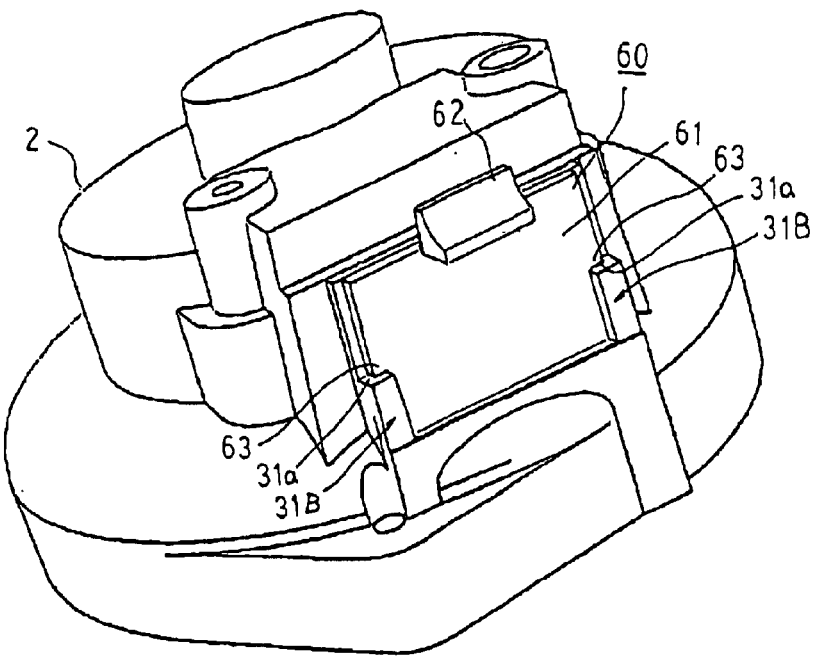
FIG. 22 is a perspective showing a rear bracket of the automotive alternator according to Embodiment 3 of the present invention with the cap mounted.
Figure 23:
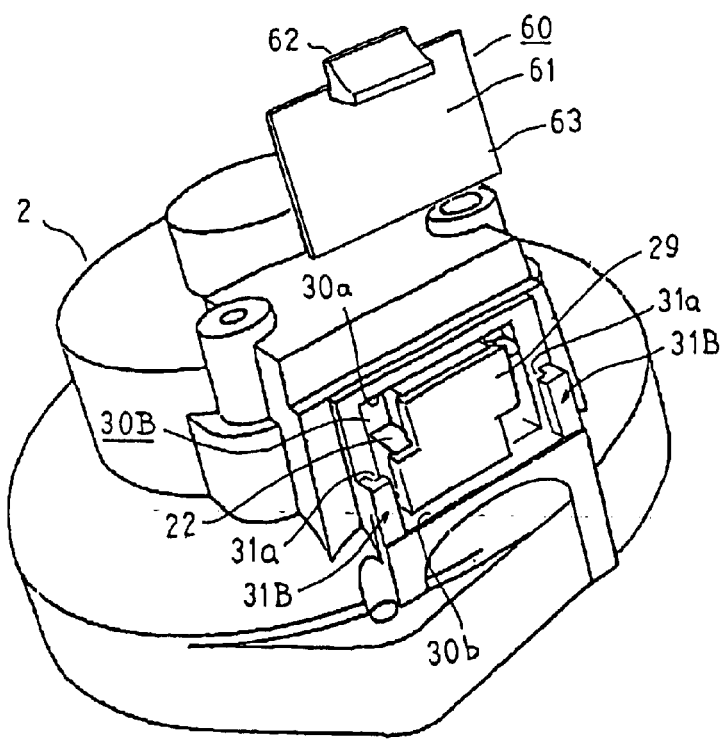
FIG. 23 is a perspective showing the rear bracket of the automotive alternator according to Embodiment 3 of the present invention with the cap removed.

FIG. 19 is a plan showing a cap used in an automotive alternator according to Embodiment 3 of the present invention, FIG. 20 is a side elevation of the cap shown in FIG. 19 viewed from direction A, FIG. 21 is a side elevation of the cap shown in FIG. 19 viewed from direction B, FIG. 22 is a perspective showing a rear bracket of the automotive alternator according to Embodiment 3 of the present invention with the cap mounted, and FIG. 23 is a perspective showing the rear bracket of the automotive alternator according to Embodiment 3 of the present invention with the cap removed.

In Embodiment 3, at rear-end ends of side portions of a rectangular opening portion 30B in the rear bracket 2, a pair of side walls 31B are formed facing each other parallel to the axial direction of the shaft 6. Grooves 31a parallel to the axial direction are formed in the facing inner wall surfaces of the pair of side walls 31B. Moreover, an upper surface of a bracket-shaped wall constituted by the front-end wall and the front-end ends of the side walls of the opening portion 30B is positioned in a common plane with lower surfaces of the grooves 31a of the side walls 31B, and an upper surface of a rear-end wall is positioned in a substantially common plane with upper surfaces of the side walls 31B.

The cap 60 is made of a PBT resin, and is constituted by: a main body portion 61 formed into a flat rectangular shape; a handle 62 disposed so as to extend from a first end of the main body portion 61; flange portions 63 formed by first and second side portions of the main body portion 61; protruding portions 64 disposed so as to protrude from an inner wall surface of the main body portion 61; and an engaging portion 65 for preventing dislodgment disposed so as to protrude from a first end of the inner wall surface of the main body portion 61.

This cap 60 is held by the handle 62, the flange portions 63 are inserted into the grooves 31a, and the cap 60 is slid until a second end portion of the main body portion 61 comes into contact with a rear-end surface 30b of the opening portion 30B. Then, a first end of the main body portion 61 is deformed elastically into a convex shape by pressing the handle 62 toward the rear-end surface 30b of the opening portion 30B. The engaging portion 65 is inserted inside the opening portion 30B by lowering the handle 62 radially downward (toward the shaft 6) with the main body portion 61 deformed elastically, and then pressure on the handle 62 is released. Thus, the main body portion 61 returns to its original state and the cap 60 is mounted to the opening portion 30B with the engaging portion 65 engaged elastically in a front-end surface 30a of the opening portion 30B. Thus, the opening portion 30B is covered by the cap 60. The protruding portions 64 press an upper surface of the cover 29 radially inward, compressing the packing on the cover 29.

During replacement of the brushes 21, the first end of the main body portion 61 is deformed elastically into a convex shape by holding the handle 62 and pressing it toward the rear-end surface 30b of the opening portion 30B. The engaging portion 65 is pulled out of the opening portion 30B by raising the handle 62 radially upward (away from the shaft 6) with the main body portion 61 deformed elastically, and then pressure on the handle 62 is released. Thus, the main body portion 61 returns to its original state. Then, the handle 62 is held and the cap 60 is pulled out by sliding it toward a front end of the opening portion 30B. Next, after removing the cover 29, the screws 28 are removed, and the brush assemblies 24 are pulled out of the brush insertion apertures 22a. Then, the brushes 21 of new brush assemblies 24 are inserted into the brush insertion apertures 22a, the brush terminals 25 are securely fastened to the terminals 23 by means of the screws 28 from longitudinally (radially) outside the brushes 21, and the cover 29 is fitted into the head portion of the brush holder 22. Next, the replacement of the brushes 21 is completed by inserting the cap 60 into the opening portion 30B in a similar manner.

Consequently, similar effects to those in Embodiment 1 above can also be achieved in Embodiment 3.

Furthermore, in Embodiment 3, because the engaging portion 65 is elastically engaged in the front-end surface 30a of the opening portion 30B by means of the force of recovery of the elastic deformation of the main body portion 61, the cap 60 is reliably prevented from dislodging due to vibration, etc.

Embodiment 4

Figure 24:
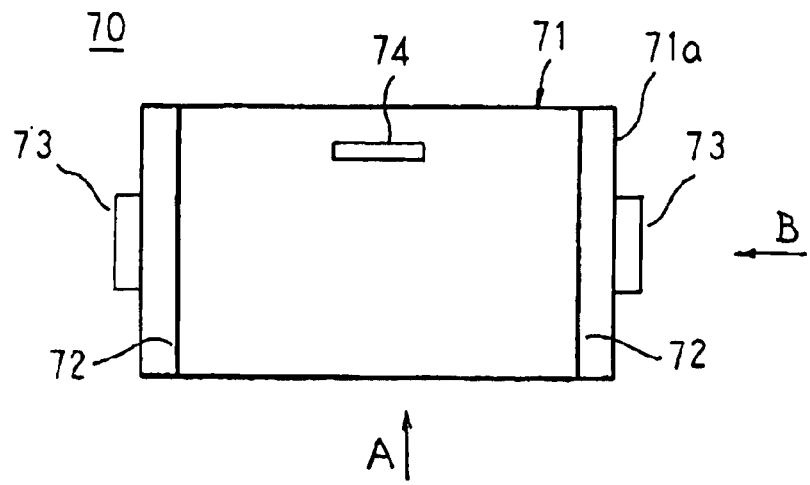
FIG. 24 is a plan showing a cap used in an automotive alternator according to Embodiment 4 of the present invention.
Figure 25:
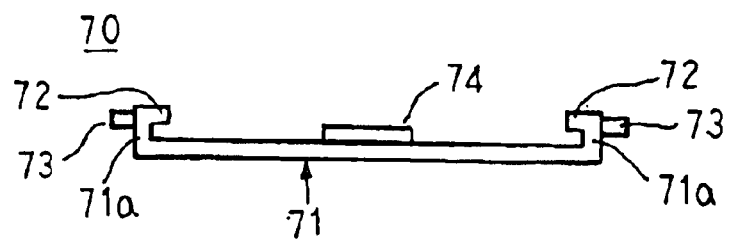
FIG. 25 is a side elevation of the cap shown in FIG. 24 viewed from direction A.
Figure 26:
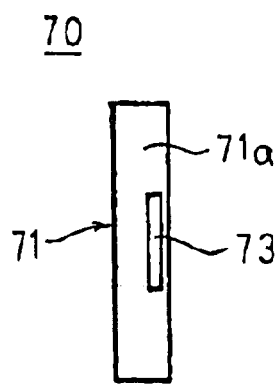
FIG. 26 is a side elevation of the cap shown in FIG. 24 viewed from direction B.
Figure 27:
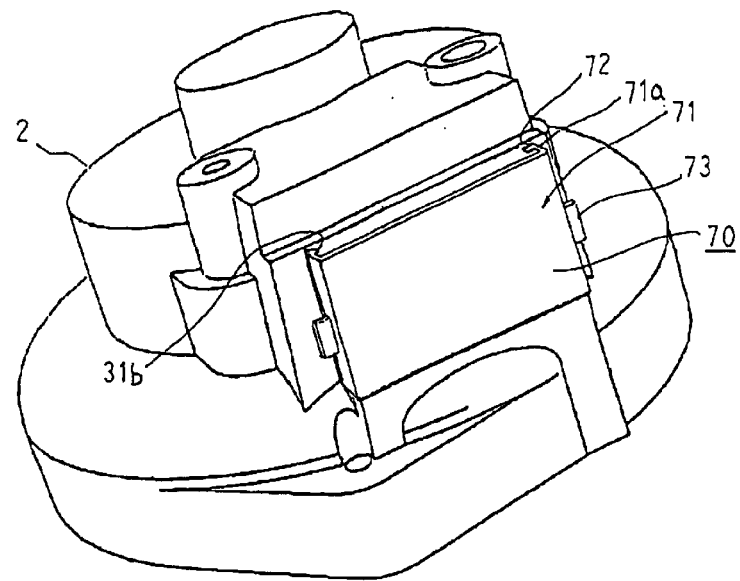
FIG. 27 is a perspective showing a rear bracket of the automotive alternator according to Embodiment 4 of the present invention with the cap mounted.
Figure 28:
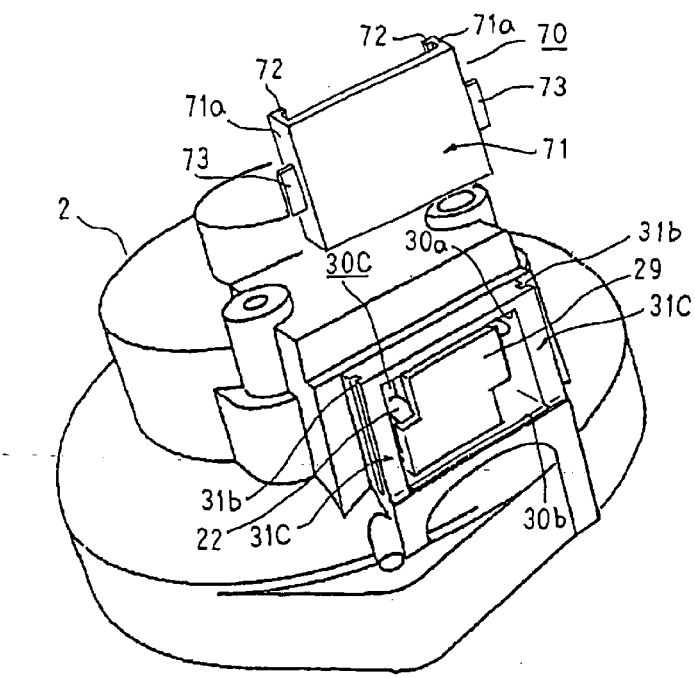
FIG. 28 is a perspective showing the rear bracket of the automotive alternator according to Embodiment 4 of the present invention with the cap removed.
Figure 29:
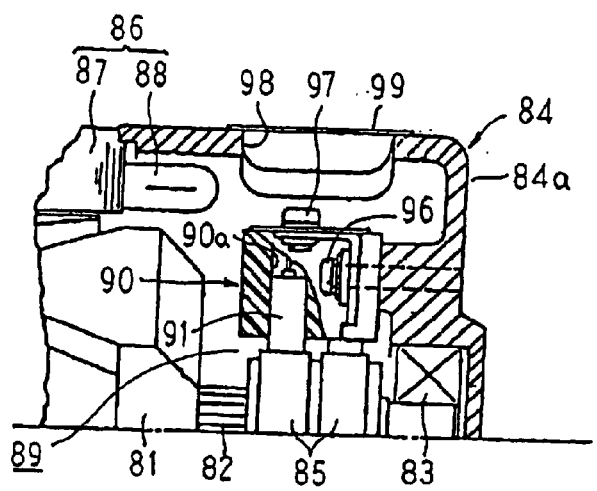
FIG. 29 is a longitudinal section showing a vicinity of a brush holding apparatus of a conventional automotive alternator.
Figure 30:
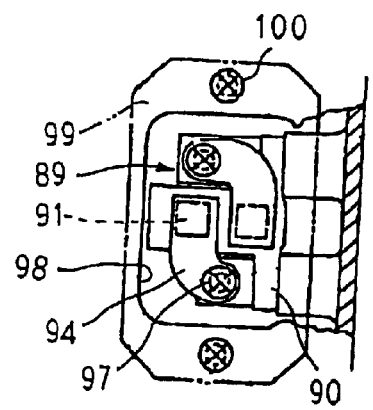
FIG. 30 is a plan showing the vicinity of the brush holding apparatus of the conventional automotive alternator.
Figure 31:
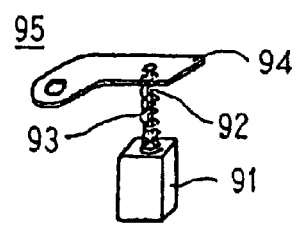
FIG. 31 is a perspective showing a brush assembly used in the brush holding apparatus of the conventional automotive alternator.

FIG. 24 is a plan showing a cap used in an automotive alternator according to Embodiment 4 of the present invention, FIG. 25 is a side elevation of the cap shown in FIG. 24 viewed from direction A, FIG. 26 is a side elevation of the cap shown in FIG. 24 viewed from direction B, FIG. 27 is a perspective showing a rear bracket of the automotive alternator according to Embodiment 4 of the present invention with the cap mounted, and FIG. 28 is a perspective showing the rear bracket of the automotive alternator according to Embodiment 4 of the present invention with the cap removed.

In Embodiment 4, three surfaces of opening edge portions of a rectangular opening portion 30C in the rear bracket 2 except for a rear-end surface 30b are formed in a bracket shape so as to be positioned in a common plane, grooves 31b parallel to the axial direction being formed in outer wall surfaces of a pair of side walls 31C.

A cap 70 is made of a PBT resin, and is constituted by: a main body portion 71 formed into a bracket shape; engaging portions 72 for preventing dislodgment disposed so as to extend inward from lower end portions of first and second sides 71a of the main body portion 71; first and second handles 73 disposed so as to extend outward from the first and second sides 71a of the main body portion 71; and a stopper 74 for preventing dislodgment disposed so as to protrude from a first end of the inner wall surface of the main body portion 71.

This cap 70 is placed over the opening portion 30C from a radial direction with the first and second handles 73 held and pulled such that the first and second sides 71a of the main body portion 71 are spread apart, and then the pulling of the handles 73 is stopped. Thus, the first and second sides 71a of the main body portion 71 return to their original state, placing the engaging portions 72 in contact with an outer wall surface of a pair of side walls 31C of the opening portion 30C. Next, the handles 73 are held, and the main body portion 71 is pressed radially downward. Then, when the engaging portions 72 reach the grooves 31b, they are fitted into the grooves 31b by the force of recovery of the main body portion 71. Thus, the opening portion 30C is covered by the cap 70. The engaging portions 72 are engaged elastically in the grooves 31b, preventing the cap 70 from dislodging. Furthermore, forward movement of the cap 70 is prevented by the stopper 74 coming into contact with a front-end surface 30a of the opening portion 30C, and rearward movement of the cap 70 is prevented by a second end surface of the cap 70 coming into contact with the rear-end surface 30b of the opening portion 30C.

During replacement of the brushes 21, the first and second handles 73 are held and pulled such that the first and second sides 71a of the main body portion 71 are spread apart, pulling the engaging portions 72 out of the grooves 31b. Then, the main body portion 71 is removed from the opening portion 30C by holding the handles 73 and pulling the main body portion 71 radially upward. Next, after removing the cover 29, the screws 28 are removed, and the brush assemblies 24 are pulled out of the brush insertion apertures 22a. Then, the brushes 21 of new brush assemblies 24 are inserted into the brush insertion apertures 22a, the brush terminals 25 are securely fastened to the terminals 23 by means of the screws 28 from longitudinally (radially) outside the brushes 21, and the cover 29 is fitted into the head portion of the brush holder 22. Next, the replacement of the brushes 21 is completed by inserting the cap 70 into the opening portion 30C in a similar manner.

Consequently, similar effects to those in Embodiment 1 above can also be achieved in Embodiment 4.

Furthermore, in Embodiment 4, it goes without saying that protruding portions for pressing the cover 29 may also be disposed on an inner wall surface of the main body portion 71 of the cap 70.

Moreover, in each of the above embodiments, the cap is made of a PBT resin, but the cap is not limited to the PBT resin, and for example, a fire resistant resin such as a polyethylene terephthalate (PET), a polyphenylene sulfide (PPS), a polyamide, etc., can be used. In that case, a cap having even more superior fire resistance can be obtained if glass fiber is added.

Furthermore, the cap does not necessarily have to be made of a resin and may also be made of a metal such as a stainless alloy, etc.

As explained above, according to one aspect of the present invention, there is provided an automotive alternator including:

a case;

a shaft, first and second ends of the shaft being rotatably supported in the case;

a rotor fixed to the shaft and rotatably disposed inside the case;

a slip ring fixed to the shaft;

a stator fixed to the case so as to surround the rotor;

a brush holder through which a brush insertion aperture is disposed and which a cover is fitted into a head portion of the brush holder, the brush holder being disposed inside the case such that an aperture direction of the brush insertion aperture is perpendicular to an axial direction of the shaft;

a brush disposed so as to be held inside the brush insertion aperture and slide in contact with the slip ring;

an opening portion formed in a portion of the case facing the cover; and a cap insertably mounted to the opening portion, simplifying removal and replacement of the cap, thereby providing an automotive alternator enabling the brush to be changed without dismantling the case.

The cap may be slidably mounted to the opening portion, improving the operation of removing and replacing the cap.

A sliding direction of the cap may be parallel to an axial direction of the shaft, providing clear space in the sliding direction of the cap when the automotive alternator is mounted to an automotive vehicle, thereby improving the operation of removing and replacing the cap.

Protruding portions may be formed on an inner wall surface of the cap, the protruding portions being constructed so as to press the cover toward the shaft when the cap is mounted to the opening portion, improving waterproofing of the brush holder, thereby suppressing the occurrence of failure due to exposure of the brush to moisture.

A handle may be formed integrally on the cap, improving the handling of the cap, thereby improving the operation of removing and replacing the cap.

Engaging portions for engaging the opening portion and preventing dislodgment may be formed integrally on the cap, reliably preventing the cap from falling off due to vibration.

The cap may be made of an elastic member, enabling the cap to be secured to the opening portion using the elasticity of the cap, thereby reducing damage to the opening portion and the cap.

The cap may be made of a resin, enabling cost reductions.

What is claimed is:

1. An automotive alternator comprising:
   a case;
   a shaft, first and second ends of said shaft being rotatably supported in said case;
   a rotor fixed to said shaft and rotatably disposed inside said case;
   a slip ring fixed to said shaft;
   a stator fixed to said case so as to surround said rotor;
   a brush holder through which a brush insertion aperture is disposed and onto which a cover is fitted into a head portion of said brush holder, said brush holder being disposed inside said case such that an aperture direction of said brush insertion aperture is perpendicular to an axial direction of said shaft;
   a brush disposed so as to be held inside said brush insertion aperture in sliding contact with said slip ring;
   an opening portion formed in a portion of said case facing said cover; and
   a cap insertably mounted to said opening portion.

2. The automotive alternator according to claim 1, wherein:
   said cap is slidably mounted to said opening portion.

3. The automotive alternator according to claim 2, wherein:
   a sliding direction of said cap is parallel to an axial direction of said shaft.

4. The automotive alternator according to claim 1, wherein:
   protruding portions are formed on an inner wall surface of said cap, said protruding portions being constructed so as to press said cover toward said shaft when said cap is mounted to said opening portion.

5. The automotive alternator according to claim 1, wherein:
   a handle is formed integrally on said cap.

6. The automotive alternator according to claim 1, wherein:
   engaging portions for engaging said opening portion and preventing dislodgment are formed integrally on said cap.

7. The automotive alternator according to claim 1, wherein:
   said cap is made of an elastic member.

8. The automotive alternator according to claim 1, wherein:
   said cap is made of a resin.

* * * * *